(12) United States Patent
Miyamoto

(10) Patent No.: US 7,248,884 B2
(45) Date of Patent: Jul. 24, 2007

(54) POSITION DATA NOTIFICATION SYSTEM AND METHOD USING EMAIL COMMUNICATIONS

(75) Inventor: Takashi Miyamoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 790 days.

(21) Appl. No.: 10/293,274

(22) Filed: Nov. 14, 2002

(65) Prior Publication Data

US 2003/0114171 A1 Jun. 19, 2003

(30) Foreign Application Priority Data

Nov. 14, 2001 (JP) ............... P. 2001-348473

(51) Int. Cl.
*H04Q 7/20* (2006.01)
(52) U.S. Cl. ................... 455/456.2; 455/457
(58) Field of Classification Search ............ 455/456.2, 455/456.1, 457, 466, 456.3, 456.6
See application file for complete search history.

(56) References Cited

U.S. PATENT DOCUMENTS 6,662,016 B1 * 12/2003 Buckham et al. ........... 455/457
2003/0045301 A1 * 3/2003 Wollrab .................... 455/456

* cited by examiner

*Primary Examiner*—Edward F. Urban
*Assistant Examiner*—Blane J. Jackson
(74) *Attorney, Agent, or Firm*—Birch, Stewart, Kolasch & Birch, LLP

(57) ABSTRACT

The present invention provides a position data notification system and a position data notification method whereby, in consonance with the will of a transient person, the current position of the pertinent person can be reported. The system of the invention includes a position search server, which is requested for position search request from a communication terminal, receives position data from another communication terminal, and creates a map on which the position of an individual user is indicated. This system also includes a group/user management DB for managing a user or a group that consists of a predetermined number of users. This system can be applied to notify current position information of a user carrying a device, which is not pre-registered for utilizing this system.

16 Claims, 4 Drawing Sheets

FIG. 2

[ POSITION DATA NOTIFICATION SERVICE ]

◎ EMAIL TRANSMISSION DESTINATION:

SEND EMAIL

CONFIRM POSITION

FIG. 3

GROUP/USER MANAGEMENT DATABASE

◎ GROUP ID: 12345
    USER ID: 1111
    USER ID: 2222
    USER ID: 3333

◎ GROUP ID: 5678
    USER ID: 5555
    USER ID: 6666

FIG. 4

WHERE ARE YOU NOW?
PLEASE CLICK ON THE FOLLOWING URL.

http://server/kensaku/position.jps?123452222

FROM: 123452222@server.co.jp

WHERE ARE YOU NOW?
(PLEASE RETURN WITH PHOTOGRAPH ATTACHED.)

POSITION DATA NOTIFICATION SYSTEM AND METHOD USING EMAIL COMMUNICATIONS

This nonprovisional application claims priority under 35 U.S.C. § 119(a) on Patent Application No. 2001-348473 filed in JAPAN on Nov. 14, 2001, which is herein incorporated by reference.

BACKGROUND OF THE INVENTION

1. Field of the Invention

The present invention relates to a position data notification system and a position data notification method, for obtaining a current position of a moving person by receiving a notification from the moving person.

2. Description of the Related Art

Presently, a position search system or service utilizing a device, such as a portable telephone or a GPS notebook computer, for identifying and displaying a current position of a user who carries the device, is provided. In addition, a peripheral data provision system or service is also presently provided, that can provide for the user owning the device the positions of restaurants around the area whereat the portable telephone or GPS notebook computer is located, as well as attribute information for the positions.

However, the conventional position search system or service capable to search for a current position of an user carrying the device, such as a portable telephone or a GPS notebook computer, is provided to only devices which are pre-registered, and is not applicable to search for positions of any devices which are not registered. Therefore, a demand exists for a system or a service whereby, regardless of whether registration has taken place, the position data for an arbitrary device can be readily obtained and the current position of the user of the device can be established.

SUMMARY OF THE INVENTION

To respond to the demand, the purpose of the present invention is to provide a position data notification system that can, upon receiving a notification from a transient person, establish the current position of that person, and a position data notification method therefor.

To achieve this purpose, a position data notification system of the present invention is for reporting the current position of a communication terminal and includes a server that can communicate with the communication terminal through a network. In this system, when the server received from a first communication terminal a request for a position search performed to determine the current position of a second communication terminal and for address data for connecting with the second communication terminal, the server transmits to the second communication terminal an email including information, that differs depending on which communication terminal receives the email. Moreover, the second communication terminal performs a predetermined process for the email received from the server, and when the current position data for the second communication terminal is transmitted to the server, the server employs the current position data to create a map indicating the current position of the second communication terminal.

Additionally, the server transmits the map to the first communication terminal in response to a map transmission request received from the first communication terminal.

Therefore, regarding the second communication terminal, from which the current position data is obtained, a map indicating the current position of the second terminal can be provided. It can be assumed that to have been transmitted the current position data for the second communication terminal to the server is equal to that the user transmitted the user's position information based on the user's decision which there is no problem to inform his/her current position. By the assumption, in this system, it can be obtain the user's current position with his/her consent. Furthermore, in this system, it is possible to request any communication terminals for notifying their current positions without any special registrations for utilizing the system.

In addition, according to a the position data notification system of the present invention, the server designates, as a group, the first communication terminal and the second communication terminal, and the email includes information used for identifying the group and the second communication terminal. Therefore, even when there are a plurality of second communication terminals, and even when all of the second communication terminals perform the predetermined process for email and transmit current position data to the server, for each group, the server can identify which communication terminal of which group that has transmitted a set of current position data.

Further, according to the position data notification system of the present invention, when the information contained in the email is a URL in email text, the predetermined process is the selection of the URL.

According to the position data notification system of the present invention, when the email address of the transmission source of the email is included in the information contained in the email, the predetermined process is the transmission of a response to the email to the email address of the transmission source.

According to the position data notification system of the present invention, an image of the periphery of the position of the second communication terminal is attached to the response for the email.

Furthermore, according to the position data notification system of the present invention, for each group, the server creates the map with the current position of the first communication terminal as the center, using a scale whereat the current position of the second. communication terminal can be displayed.

The present invention also provides a position search server utilized in a position data notification system according to one of the first to seventh aspects.

Further more, the present invention provides a position data notification method for providing a notification of the current position of a communication terminal, using a position data notification system that includes the communication terminal and a server that communicates with the communication terminal via a network. This method includes: an email transmission step of the server, upon receiving from a first communication terminal a position search request for the performance of a search for the current position of a second communication terminal and for destination data to be used for connecting with the second communication terminal, transmitting to the second communication terminal an email including information that differs, depending on which communication terminal receives the email; a current position information notification step of the second communication terminal performing a predetermined process for an email received from the server and transmitting to the server current position data for the second communication terminal; and a map creating step of the server employing the current position data to create a map indicating the current position of the second communication terminal.

The method of the present invention further includes a map transmission step of the server, upon receiving from the first communication terminal a map transmission request for the map created at the map creating step, transmitting the map to the first communication terminal.

BRIEF DESCRIPTION OF THE DRAWINGS

FIG. 2 is a diagram for explaining the screen displayed by a portable telephone when an application is performed;

FIG. 3 is a diagram for explaining the data structure of a group/user management DB;

FIG. 4 is a diagram for explaining a display screen for email text;

Figure 1:
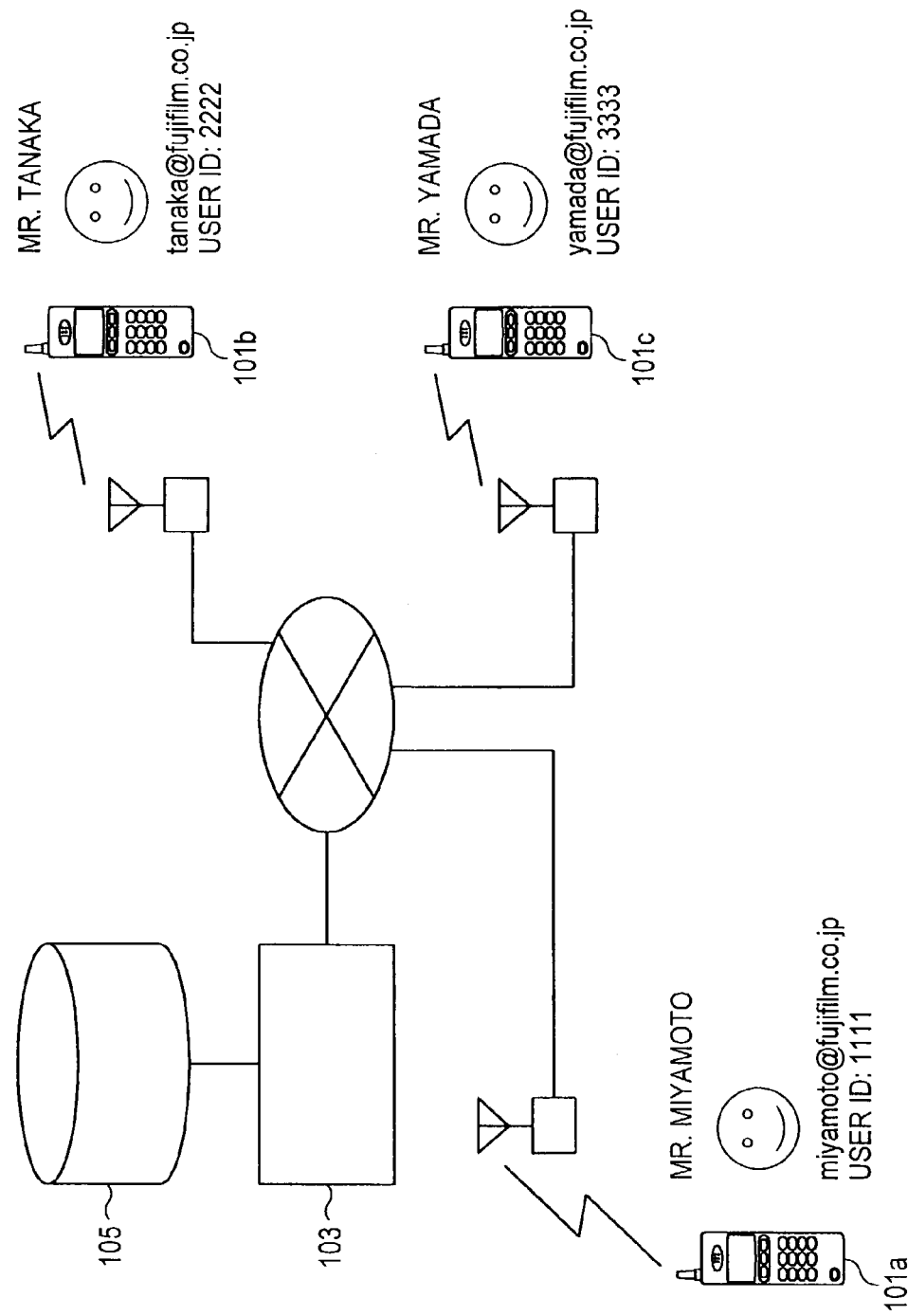
FIG. 1 is a diagram showing a position data notification system according to a first embodiment of the present invention.

In the figures reference numerals 101a, 101b, and 110c refer to communication terminals; 103 to a position search server; 105 to a group/user management database; 201 to a receiving section; 202 to a transmitting section; 203 to a email message creating section; and 204 to a map creating section.

DETAILED DESCRIPTION OF THE PREFERRED EMBODIMENTS

According to the position data notification system and the position data notification method of the present invention, a user of this system specifies another user, and the thus specified user supplies, to the user, a position data related notification that enables the user to identify the current position of the specified user. To explain how, for this purpose, the provisions of the position data notification system and the position data notification method are implemented, descriptions of a first embodiment and of a second embodiment, presented in the same order, will now be given while referring to the accompanying drawings.

FIG. 1 is a diagram showing the configuration of a position data notification system according to the first embodiment of this invention. In FIG. 1, the position data notification system for this embodiment includes: communication terminals 101 (101a to 101c); a position search server 103, which corresponds to a server according to the claims of this invention; and a group/user management database (hereinafter referred to as a group/user management DB) 105.

The individual components of the position data notification system of the embodiment will now be described.

First, the communication terminals 101 are devices that can be used to specify the position of a portable telephone or of a GPS notebook computer and that, through a base station, can connect to and communicate with the position search server 103. Henceforth, in the descriptions, the devices represented by the communication terminals 101 will be portable telephones. Installed in each of the communication terminals 101 is an application for using a position data notification service provided by the system. And when this application is employed, as is shown in FIG. 2, provided on the display of the portable telephone are a column for entering the email address (the email transmission destination) of the portable telephone owned by a user whose current position the user of the system wishes to obtain; an instruction portion (hereinafter referred to as an email transmission button) for designating the transmission of an email whereby a request is forwarded to the position search server 103 for the current position of the portable telephone having the email address entered in the column; and an instruction portion (hereinafter referred to as a position confirmation button) for requesting the display of the current position of the portable telephone reported to the position search server 103, i.e., the current position of the owner of the portable telephone. When the email address has been entered in the column for the email transmission destination and the email transmission button is depressed, the portable telephone 101 transmits, to the position search server 103, a request that a search be performed to obtain the position of the portable telephone having the corresponding email address.

The position search server 103 accepts the position search request from the user (the portable telephone) of the system, or employs the position data received from the user (the portable telephone) to create a map on which the position of each user is indicated. For this purpose, the position search server 103 employs the group/user management DB 105, a database provided for the management of groups consisting of predetermined users or of individual users who employ this system. The group/user management DB 105 may be integrally provided for the position search server 103.

Figure 7:
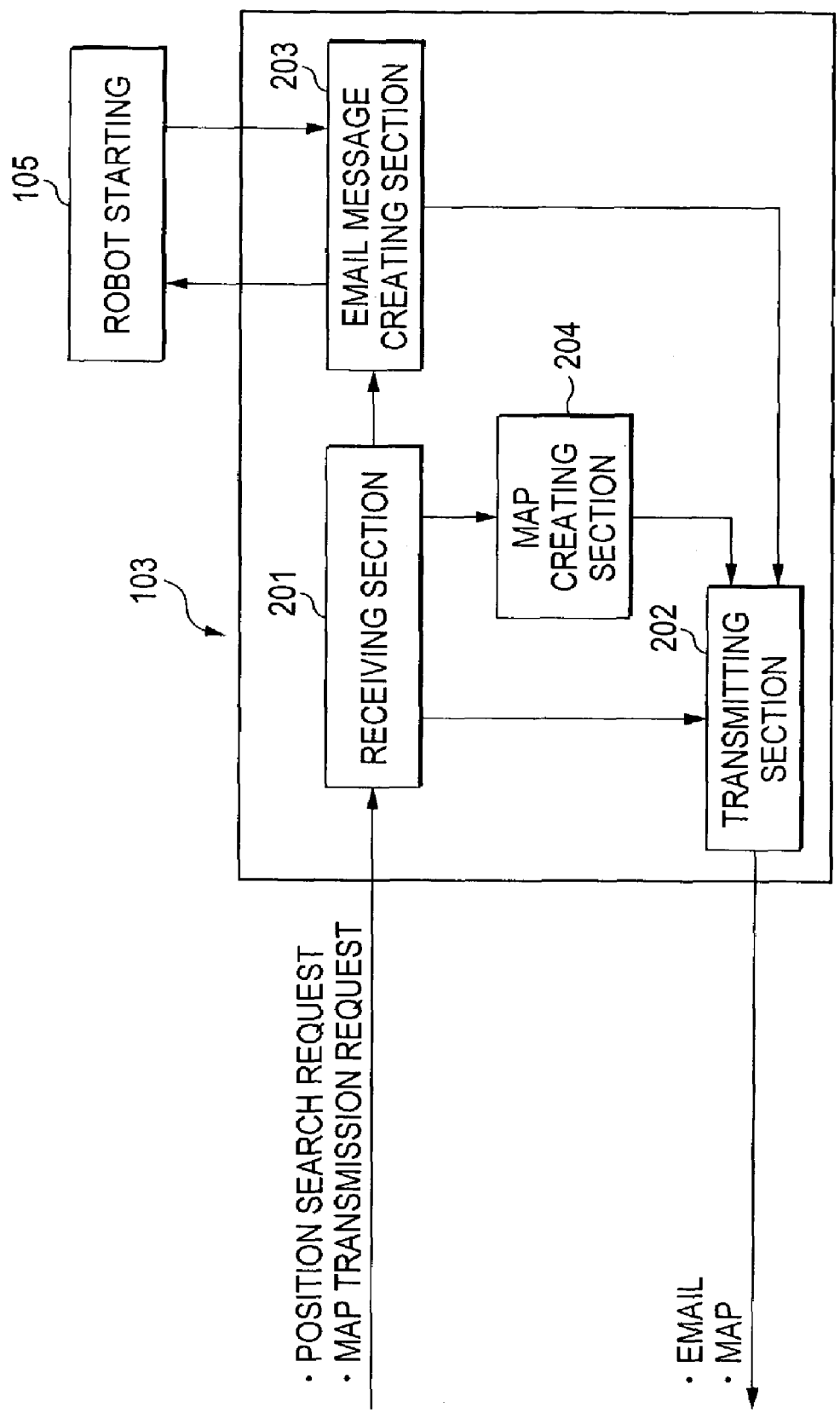
FIG. 7 is a diagram for explaining an example of construction of a position search server provided by this invention.

FIG. 7 shows an example construction of the position search server 103. In this example, the position search server includes a receiving section 201, a transmitting section 202, an email message creating section 203, and a map creating section 205. The receiving section 201 receives requests and information, which are position information, user data, or such, from communication terminals. According to the received information or request, the email message creating section 203 creates email including predetermined information depending on a communication terminal to which the email is transmitted. In order to create the email, the server can refer to the user/group management DB 105, if it is necessary. The transmitting section 202 transmits the created email to a communication terminal asked for, and the communication terminal, which receives the email, transmits current position information thereof as a response to the position search server 103. After receiving the current position information, the map creating section 204 creates a map indicating a current position of the communication terminal asked for. Then, the transmitting section 202 transmits the created map to another communication terminal, which issues a map transmission request.

In this invention, groups are constituted by users who request searches be performed to obtain the current positions of other system users and by those users who are requested to report their current positions in response to position search requests, i.e., the other system users. A different ID (hereinafter referred to as a group ID) is provided for each group, and a user ID is assigned as identification information for each user. User IDs may be assigned in advance, or temporary IDs may be assigned each time a position search request is issued. Therefore, recorded for each group, as is shown in FIG. 3, are the group ID and the user IDs and the corresponding email addresses of the users constituting the group.

An explanation will now be given for the operation of the position data notification system and the position data notification method therefor, when performed for an example wherein "Miyamoto", who is a user of this system, desires to obtain the current positions of "Tanaka" and "Yamada", who are also users of the system. Miyamoto has the user ID "1111" and owns a portable telephone 101a that can receive an email addressed to:

"HYPERLINK 'mailto: miyamoto@fujifilm.co.jp' miyamoto@fujifilm.co.jp".

Tanaka has the user ID "2222" and owns a portable telephone 101b that can receive an email addressed to:

"HYPERLINK 'mailto: miyamoto@fujifilm.co.jp' tanaka@fujifilm.co.jp".

And Yamada has the user ID "3333" and owns a portable telephone 101c that can receive an email addressed to:

"HYPERLINK 'mailto: miyamoto@fujifilm.co.jp' yamada@fujifilm.co.jp".

First, when Miyamoto activates the application using the portable telephone 101a, the screen in FIG. 2 is displayed on the display of the portable telephone 101a. Then, when Miyamoto enters in the email transmission destination column the email addresses for Tanaka and Yamada, "HYPERLINK 'mailto: miyamoto@fujifilm.co.jp' tanaka@fujifilm.co.jp" and "HYPERLINK 'mailto: miyamoto@fujifilm.co.jp' yamada@fujifilm.co.jp", and selects the mail transmission button, a position search request for the performance of a search for the positions of Tanaka and Yamada is transmitted by the portable telephone 101a to the position search server 103. At this time, position data for the portable telephone 101a owned by Miyamoto is also transmitted to the position search server 103.

Upon receiving the position search request, the position search server 103 assigns a group ID, such as "12345", to a group consisting of Miyamoto, Tanaka and Yamada, and as is shown in FIG. 3, stores the group structure in the group/user management DB 105. Then, the position search server 103 transmits emails, the contents of which are shown in FIG. 4, to the portable telephone 101b owned by Tanaka and the portable telephone 101c owned by Yamada. Included in the email text is a message requesting notification of the current position and a URL linked to a predetermined server document.

When the user selects the URL displayed on the portable telephone 101, a program is executed that transmits notification of the current position of the portable telephone 101 to the position search server 103. More specifically, since a tag for reporting the current position data is embedded in the source of a page pointed to by the URL, based on a command represented by the tag, the ID of the base station with which the portable telephone 101 is currently communicating or latitude/longitude data provided by the GPS are transmitted to the position search server 103.

In the email addressed to Tanaka and the email addressed to Yamada, both of which are transmitted by the position search server 103, the URLs differ. For example, as is shown in FIG. 4, in the email for the portable telephone 101b owned by Tanaka the URL is:

"http://sever/kensaku/position.jsp?123452222". That is, the first five characters of the last nine characters of the URL represent the group ID, and the other four characters represent the user ID. Thus, the URL differs depending on the user.

When Tanaka and Yamada, who have received the emails from the position search server 103, decide to transmit notifications of their current positions, they select the URLs in the emails. And when the URLs are selected, the programs for transmitting current position notifications to the position search server 103 are executed, and data (hereinafter referred to as current position data) indicating the current positions of the portable telephones 101 are transmitted to the position search server 103. The current position data may be the IDs of the base stations with which the portable telephones 101 are communicating or latitude/longitude position data provided by the GPS.

Figures 5, 6:
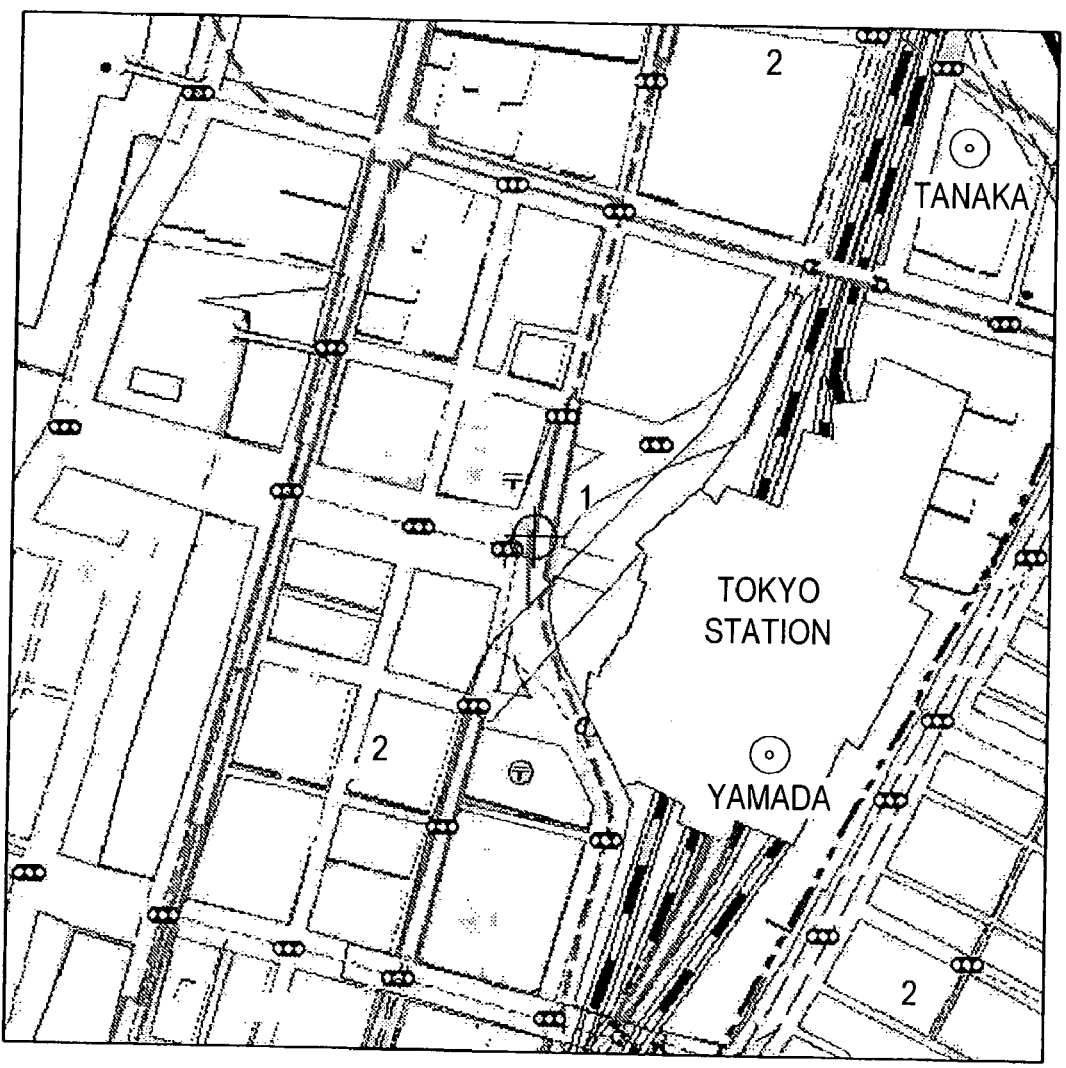
FIG. 5 is a diagram for explaining an example map.
FIG. 6 is a diagram for explaining a display screen for email according to a second embodiment of the present invention.

Upon receiving the current position data from Tanaka and Yamada, the position search server 103 employs the group IDs and the users IDs, which can be obtained from the URLs, and the current position data to create a map indicating the current positions of the users. An example map is shown in FIG. 5. The map is stored in the position search server 103, and each time current position data is received from a user in the same group, the map is updated and the current position of the user is added or deleted.

Subsequently, Miyamoto, who issued the position search request to the position search server 103, activates the application again to display on the portable telephone 101a the map indicating the current positions of Tanaka and Yamada. As occurred previously, the screen in FIG. 2 is displayed on the display of the portable telephone 101a, and when the position confirmation button is selected, a map transmission request is issued by the portable telephone 101a to the position search server 103, which, upon receiving the map transmission request, transmits the map to the portable telephone 101a as image data. In this manner, the map indicating the current positions of Tanaka and Yamada is displayed on the display of the portable telephone 101a belonging to Miyamoto.

In the foregoing description of the first embodiment, different URLs are written in the text for the emails that the position search server 103 transmits to the individual users (Tanaka and Yamada), and based on the URLs, the group ID and the user IDs can be identified. However, in a second embodiment, emails are transmitted using source addresses that differ depending on which users receive the emails. The source addresses are prepared by the position search server 103, an email account for the transmission source address is constituted by a group ID and a user ID that corresponds to each user. As is shown in FIG. 6, an email addressed to Tanaka (user ID: 2222) is transmitted by "123452222@server.co.jp", and a message requesting the current position is written in the text.

Upon receiving this email, Tanaka transmits to the position search server 103 an email response in which the current position data for the portable telephone 101b owned by Tanaka are written. Furthermore, a photograph of the scene at a current position may be taken, using a device such as a GPS digital camera owned by a user, and may be transmitted with the current position data.

As is described above, according to the position data notification system and the position data notification method of the embodiments, when a user of this system desires to obtain the current position of one or more other users, the user need only employ a portable telephone 101 to create an email in which the email addresses of the different users are entered and to transmit the email to a position search server 103, which thereafter transmits emails to the other users requesting their current positions. So long as the current position data can be obtained from the other users, the position search server 103 can use these data to indicate on a map the current positions of the users, and the map can be used to apprise the user, who issued the position search request, of the current positions of the other users.

When the position search server 103 obtains the current position data, it means that the other users have agreed to submit current position notifications, and have manipulated their portable telephones 101 to transmit current position data. Thus, consonant with the will of the other users, the user is allowed to obtain their current positions. And therefore, the user can request that an arbitrary user provide a current position notification without a special registration for the usage of this system or the registration of a portable telephone 101 being required.

As is described above, according to the position data notification system and the position data notification method of the present invention, for the second communication terminal for which current position data is obtained, a map indicating the current position of that terminal can be created. And when the current position data for the second communication terminal is transmitted to the server, it means that the owner of the second communication terminal has agreed to transmit the current position notification and the current position data. Therefore, consonant with the will of the owner of the second communication terminal, the position data notification system can be used and the current position of the owner can be obtained.

What is claimed is:

1. A position data notification system for reporting a current position of a communication terminal said system comprising:
    a position search server that can communicate with said communication terminal through a network;
    said communication terminal including a position notification function in which a position search request is made for a second communication terminal by including an email address that corresponds to the second communication terminal, in the position notification function,
    wherein,
    when said server receives a position search request for searching a current position of a second communication terminal and an address data of the second communication terminal from a first communication terminal, said server transmits an email including information, that differs depending on which communication terminal receives said email, to said second communication terminal, and
    when a current position information of the second communication terminal is notified to said server by performing a predetermined process to the email transmitted from said server in the second communication terminal, said server creates a map indicating the current position of said second communication terminal according to the current position information.

2. The position data communication system according to claim 1, wherein, when said server receives a map transmission request from said first communication terminal, said server transmits said map to said first communication terminal.

3. The position data notification system according to claim 2, wherein said server designates, as a group, said first communication terminal and said second communication terminal, and
    wherein said email includes information used for identifying said group and said second communication terminal.

4. The position data notification system according to claim 3,
    wherein, when the information contained in said email is a URL in a text body of said email, said predetermined process performed in said second terminal is to select said URL.

5. The position data notification system according to claim 3,
    wherein, when the information contained in said email is an email address prepared by said server as a transmission source account, said predetermined process in performed in said second communication terminal is to transmit a response to said email address prepared by said server.

6. The position data notification system according to claim 5, wherein an image of the periphery of the position of said second communication terminal is attached to said response for said email.

7. The position data notification system according to claim 3, wherein, for each group, said server creates said map with the current position of said first communication terminal as the center, using a scale whereat the current position of said second communication terminal can be displayed.

8. The position data notification system according to claim 1, wherein said server designates, as a group, said first communication terminal and said second communication terminal, and
    wherein said email includes information used for identifying said group and said second communication terminal.

9. The position data notification system according to claim 8,
    wherein, when the information contained in said email is a URL in a text body of said email, said predetermined process performed in said second terminal is to select said URL.

10. The position data notification system according to claim 8, wherein, when the information contained in said email is an email address prepared by said server as a transmission source account, said predetermined process performed in said second communication terminal is to transmit a response to said email address prepared by said server.

11. The position data notification system according to claim 10, wherein an image of the periphery of the position of said second communication terminal is attached to said response for said email.

12. The position data notification system according to claim 8, wherein, for each group, said server creates said map with the current position of said first communication terminal as the center, using a scale whereat the current position of said second communication terminal can be displayed.

13. A position search server utilized for a position data notification system and capable of communicating with communication terminals through a network, said server comprising:
    a receiving section for receiving position search requests and information data from communication terminals,
    wherein said communication terminals include a position notification function in which a position search request is made by insertion of an address data identify the one or more terminals for which a position is requested;
    a transmitting section for transmitting information data to the communication terminals;

an email message creating section for creating an email including information, that differs depending on which communication terminal receives the email, according to the request and information received by the receiving section; and a map creating section for creating a map indicating a current position of the communication terminal;

wherein, when said receiving section receives a position search request for requesting for searching a current position of a second communication terminal and address data of the second communication terminal from a first communication terminal, said email message creating section prepares an email including information suitable for said second communication terminal, and said transmitting section transmits said email created by said email message creating section to said second communication terminal, and wherein, when said receiving section receives a current position information of the second communication terminal by performing a predetermined process to said email by the second communication terminal, said map creating section creates a map indicating the current position of said second communication terminal according to the current position information.

14. The position search server according to claim 13, wherein, when said receiving section server further receives a map transmission request from said first communication terminal, said transmitting section transmits said map created by said map creating section to said first communication terminal.

15. A position data notification method, for providing a notification of the current position of a communication terminal, using a position data notification system that includes said communication terminal and a server that communicates with said communication terminal via a network, comprising:

requesting a position notification by a first terminal using a position notification function in which a position search request is made for a second communication terminal by including a email address that corresponds to the second communication terminal, in the position notification function;

an email transmission step of said server, upon receiving from said first communication terminal said position search request for the performance of a search for the current position of said second communication terminal and for destination data to be used for connecting with said second communication terminal an email including information that differs, depending on which communication terminal receives said email;

a current position information notification step of said second communication terminal performing a predetermined process for an email received from said server and transmitting to said server current position data for said second communication terminal; and a map creating step of said server employing said current position data to create a map indicating the current position of said second communication terminal.

16. The position data notification method according to claim 15, further comprising:

a map transmission step of said server, upon receiving from said first communication terminal a map transmission request for said map created at said map creating step, transmitting said map to said first communication terminal.

* * * * *